US006478332B1

(12) United States Patent
Ono et al.

(10) Patent No.: US 6,478,332 B1
(45) Date of Patent: Nov. 12, 2002

(54) AUTOMOTIVE AIR BAG DEVICE

(75) Inventors: Kazumi Ono; Yorihito Okuda; Tsuneo Sasaki, all of Omiya (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/696,554

(22) Filed: Oct. 25, 2000

(30) Foreign Application Priority Data

Oct. 29, 1999 (JP) ........................................... 11-308566
Apr. 28, 2000 (JP) ....................................... 2000-129414

(51) Int. Cl.[7] ................................................ B60R 21/16
(52) U.S. Cl. .................................. 280/743.2; 280/743.1
(58) Field of Search ............................ 280/743.1, 743.2

(56) References Cited

U.S. PATENT DOCUMENTS 3,879,057 A * 4/1975 Kawashima et al. ..... 280/743.2
5,358,273 A 10/1994 Onishi
5,362,101 A 11/1994 Sugiura et al.
5,464,250 A * 11/1995 Sato ........................ 280/743.2
6,095,557 A * 8/2000 Takimoto et al. ........ 280/743.2

* cited by examiner

*Primary Examiner*—Eric Culbreth
(74) *Attorney, Agent, or Firm*—Darby & Darby

(57) ABSTRACT

An air bag unit includes a restrictive element, affixed within the air bag unit, which restricts lateral expansion of the air bag unit. The lateral restriction increases longitudinal expansion toward an occupant position.

6 Claims, 11 Drawing Sheets

AUTOMOTIVE AIR BAG DEVICE

BACKGROUND OF THE INVENTION

1. Field of the Invention

The present invention relates to an automotive air bag device that provides greater projection of a main bag unit using an inexpensive structure.

2. Description of the Related Art

Certain vehicles, such as automobiles, are equipped with conventional air bag devices serving as emergency safety measures. Conventional air bag devices contain a main bag unit stored in a folded state within a housing disposed inside the vehicle's instrument panel. Upon an impact at or greater than a predetermined value, the main bag unit expands and projects. This expansion is driven by pressurized gas. As a result, conventional air bag devices support and protect occupants positioned at fixed distances from the air bag device.

Referring to FIG. 15, a conventional two-piece air bag device includes a main bag unit, shown generally at 15', formed from a pair of base fabric sections 1, 2. A seam line 3 affixes base fabric sections 1, 2 together along a perimeter. A first side of main bag unit 15' includes a gas entry opening 6 for receiving gas pressurizing main bag unit 15'. The first side of main bag unit 15' also includes a pair of vent holes 7,7, formed for adjusting the pressure inside main bag unit 15'. Base fabric sections 1, 2 are conventionally affixed together by sewing along seam line 3.

Upon inflation of main bag unit 15', a volume contained between base fabric sections 1,2 increases causing main bag unit 15' to project away from an instrument panel (not shown) toward a desired contact position (not shown). The shape of base fabric sections 1,2 determines both the final inflated form of main bag unit 15' and the amount of protection of main bag unit 15' toward the desired contact position (not shown). When a manufacturer desires to change either the final inflated form or the amount of projection of conventional main bag unit 15' the manufacturer must change the shape and size of base fabric sections 1,2.

Referring to FIG. 16, a conventional three-piece air bag device includes a main bag unit, shown generally at 15", formed from a pair of side fabric sections 4, 4 and a band-shaped base fabric section 5. Side fabric sections 4, 4 are affixed to base fabric section 5 along perimeter sections by two seam lines (not shown). A gas entry opening 6, for receiving pressurizing gas into conventional main bag unit 15", is formed by side fabric sections 4, 4 and base fabric section 5 affixed together by seam lines (not shown). A pair of vent holes, one shown at 7, is included in side fabric sections 4,4 for adjusting the pressure inside main bag unit 15". Conventionally, side fabric sections 4, 4 are affixed to base fabric section 5 by sewing.

Upon inflation of main bag unit 15", volume contained between side fabric sections 4, 4 and base fabric section 5, increases causing main bag unit 15" to project away from an instrument panel (not shown) toward a desired contact position (not shown). Conventionally, the shape of side fabric sections 4, 4 and base fabric section 5 determines both the final inflated form of main bag unit 15" and the amount of projection toward the desired contact position (not shown).

Where a manufacturer desires to change either the final inflated form or the projection amount of conventional main bag unit 15" the manufacturer must change the shape or size of side fabric sections 4, 4 and base fabric section 5.

Conventional three-piece main bag unit 15" provides greater projection toward the desired contact position(not shown) than conventional two-piece main bag unit 15', but requires more fabric and greater labor thus adversely affecting material costs and labor costs.

OBJECTS AND SUMMARY OF THE INVENTION

It is an object of the present invention to minimize the problems described above and to provide an automotive air bag device that can increase the projection distance of a main bag unit.

It is an object of the present invention to provide an automotive air bag device that can increase the projection of a main bag unit using an inexpensive structure.

The present invention relates to an air bag unit including a restrictive element, affixed within the air bag unit which restricts lateral expansion of the air bag unit. The lateral restriction increases longitudinal expansion toward an occupant position.

According to an embodiment of the present invention there is provided, an air bag comprising: a belt in an interior of the air bag, the air bag being of a type which expands in an expansion direction into a space in a vehicle, the belt limiting expansion of the air bag in a limiting direction, and the limiting direction being at an angle to the expansion direction, whereby expansion of the air bag in the expansion direction is increased.

According to another embodiment of the present invention there is provided, an air bag device comprising: an air bag unit, the air bag unit includes at least a first and a second base piece, the base pieces affixed together along a continuous seam element, a first and a second lateral position on the seam element established relative to an optimal external occupant position, the lateral positions separated by a first distance, means for restricting fixed between the lateral positions, the means has a restrictive length, the restrictive length being less than the first distance, and the restrictive means provides reduction in the first distance thereby increasing longitudinal expansion of the air bag unit into the external occupant position.

According to another embodiment of the present invention there is provided, an air bag device wherein: the restricting means is a belt, the belt having a first and second end and a first and second intermediate position, the first and the second ends affixed together, the first intermediate position on the belt affixed to the first lateral position, and the second intermediate position is affixed to the second lateral position.

According to another embodiment of the present invention there is provided, an air bag device wherein: the belt includes an intermediate section between the first and second intermediate positions, and the intermediate section overlapped and sewn thereby adjusting the restricting length.

According to another embodiment of the present invention there is provided, an air bag device further comprising: means for minimizing expansion failure along the perimeter seam element, and the minimizing means absorbs expansion force thereby preventing the perimeter seam element from failing when the air bag expands.

According to another embodiment of the present invention there is provided, an air bag device wherein: the minimizing means includes a first and a second margin extending from the base pieces, the margins extend away from the corresponding lateral positions, the restrictive means affixed between the first and the second margins along a pair of seams distinct from the continuous seam element, and the margins preferentially failing under expansion pressure thereby preventing the perimeter seam element from failing.

According to another embodiment of the present invention there is provided, an air bag device wherein: the minimizing means includes a first and a second weak section, the weak sections formed between the seam element and each the corresponding margin, and the weak sections preferentially failing under expansion pressure there preventing the perimeter seam element from failing.

According to another embodiment of the present invention there is provided, an air bag device, further comprising: a third base piece, the third base pieces fixed in two continuous seam elements to the first and second base pieces, and the third base piece provides further longitudinal expansion of the air bag unit relative to the occupant position.

According to another embodiment of the present invention there is an automotive air bag device equipped with a main bag unit, the main bag unit comprising: a first and a second base fabric, each of the first and second base fabrics has substantially the same shape, each of the first and second base fabrics fixed together along an outer perimeter by a seam line, the outer perimeter having a first and a second lateral side, the lateral sides positioned relative to an occupant position, the lateral sides separated by a distance, means for restricting expansion of the main bag unit during inflation, and the restrictive means provides localized reduction of the distance between the lateral sides thereby increasing projection of the main bag unit towards the occupant position.

According to another embodiment of the present invention there is a main bag unit, wherein: the width restricting means is a belt having a first and a second end, the belt being sewn to the base fabrics along each lateral side, and a pair of positions intermediate the ends sewn together thereby increasing projection of the main bag unit towards the occupant.

According to another embodiment of the present invention there is a main bag unit, wherein: each lateral side is positioned relative to an upper body portion of the occupant position.

According to another embodiment of the present invention there is a main bag unit, further comprising: a pair of margins extending from the base fabrics away from the outer perimeter, and the width restricting means affixed along each margin at a correspond lateral seam line adjacent to the lateral sides.

According to another embodiment of the present invention there is a main bag unit, further comprising: a first and a second weak section, each weak section positioned between each the corresponding margin and the seam line.

According to another embodiment of the present invention there is a main bag unit, wherein: the restrictive means overlapped at an intermediate section, and an intermediate seam line fixed across said intermediate section thereby reducing said distance between said lateral sides.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 8 (B) is a side view drawing showing the main bag unit projecting to an occupant position.

DETAILED DESCRIPTION OF THE PREFERRED EMBODIMENTS

Figure 1:
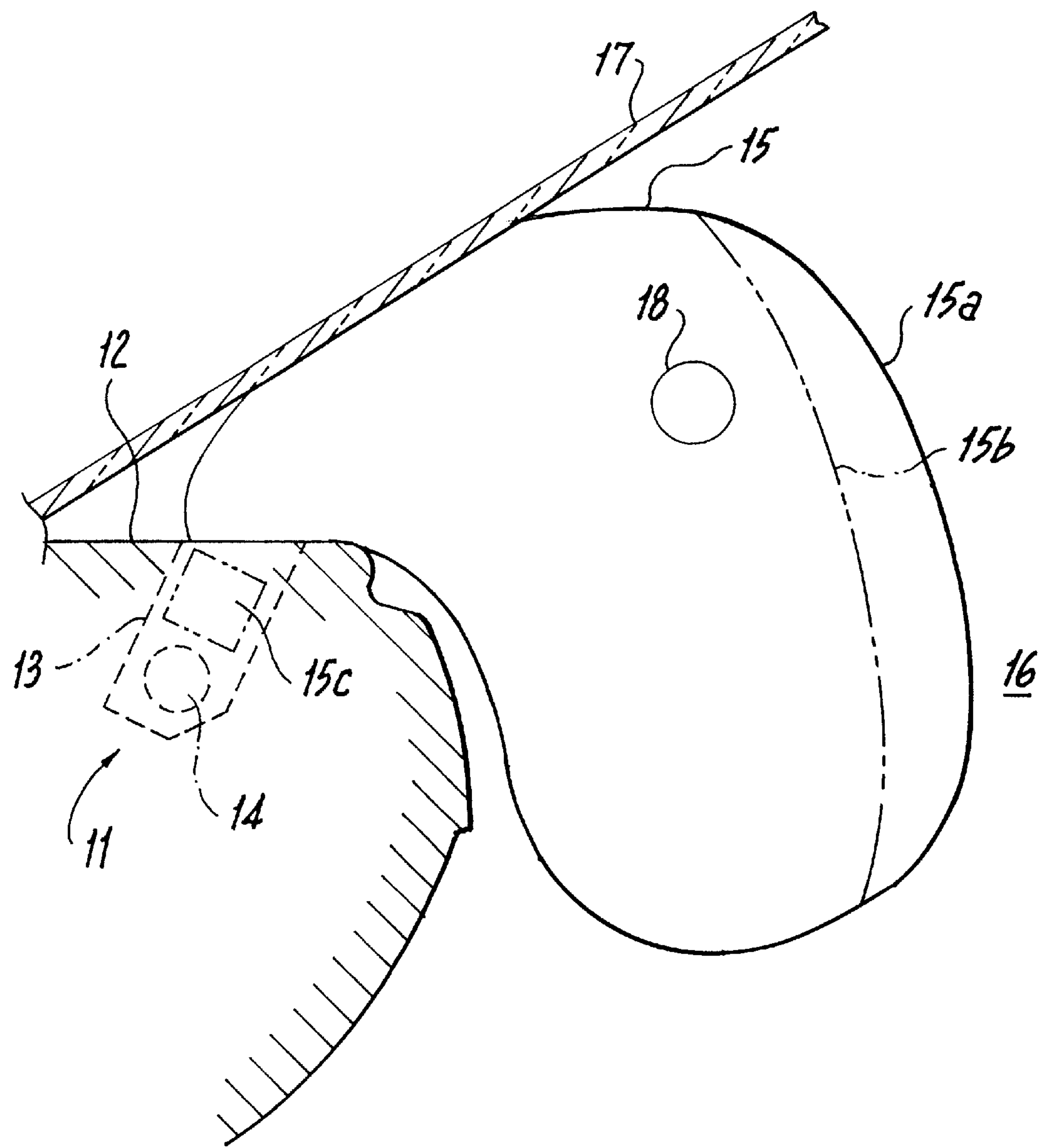
FIG. 1 is a side-view drawing of an air bag device according to a first embodiment of the present invention.

Referring to FIG. 1, a first embodiment of an expanded main bag unit 15 extends from a housing 13, adjacent to a front window glass 17, towards an occupant position 16 within a vehicle(not shown). An instrument panel 12 contains an air bag device 11 having a housing 13. Housing 13 contains an inflator 14 for inflating main bag unit 15 and a main bag container 15*c* for containing main bag 15 prior to expansion. Main bag unit 15 is typically folded and stored in housing 13 until actuation of inflator 14.

During use, inflator 14 actuates upon a sufficient impact and emits a pressurizing gas(not shown). During actuation, inflator 14 fills and extends main bag unit 15 from instrument panel 12 towards occupant position 16 until reaching a desired main bag position 15*a*. A vent hole 18 is on a side of main bag unit 15, facing away from housing 13, and front glass window 17. Vent hole 18, adjusts the internal pressure in main bag unit 15. Main bag position 15*a* is closer to occupant position 16 than a conventional main bag position 15*b*.

Figure 2:
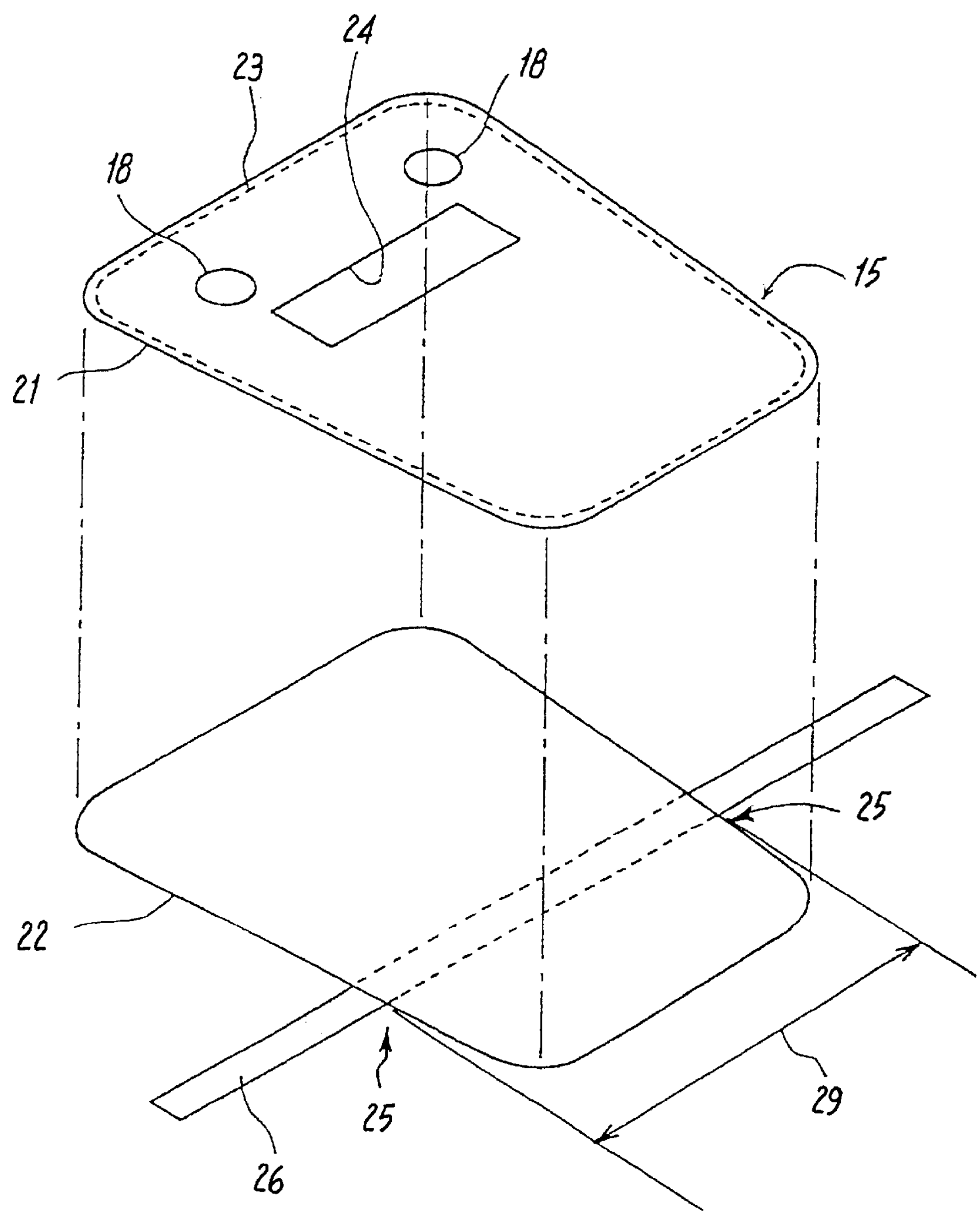
FIG. 2 is an exploded perspective view of the main bag unit from FIG. 1.

Additionally referring now to FIG. 2, main bag unit 15 includes a first base fabric 21 and a second base fabric 22, each having generally ovoid shapes, affixed together along an outer perimeter seam line 23. First base fabric 21 includes a gas entry opening 24 positioned in a central region for receiving pressurizing gas (not shown). First base fabric 21 also includes offset vent holes 18, 18, positioned near gas entry opening 24, for adjusting the internal pressure of main bag unit 15 during use. First base fabric 21 and second base fabric 22 are typically affixed together along seam line 23 by sewing.

A first lateral position 25 is defined along the outer perimeter of main bag unit 15 proximal to a portion of main bag unit 15 entering occupant position 16 (not shown) upon expansion. A second lateral position 25 is defined along a complementary portion of the outer perimeter of main bag unit 15 so that a width 29 is defined across main bag unit 15 between positions 25, 25. Positions 25, 25 correspond to an upper body or head region of an occupant (not shown) in occupant position 16 (not shown), as will be explained.

A belt 26, having a first and a second end, is affixed between positions 25, 25 on seam line 23 along width 29, on an outside surface of second base fabric 22. Belt 26 extends between positions 25, 25 on main bag unit 15 and the first and second ends of belt 26 extend away from main bag unit 15. Belt 26 is typically affixed along seam line 23 by sewing. Belt 26 serves as a restricting means, as will be explained. Although, the restricting means is described as a belt of flexible material or similar element, the width restricting means could also be a rigid, semi-rigid member, or hinged element performing the recited function.

Figure 3:
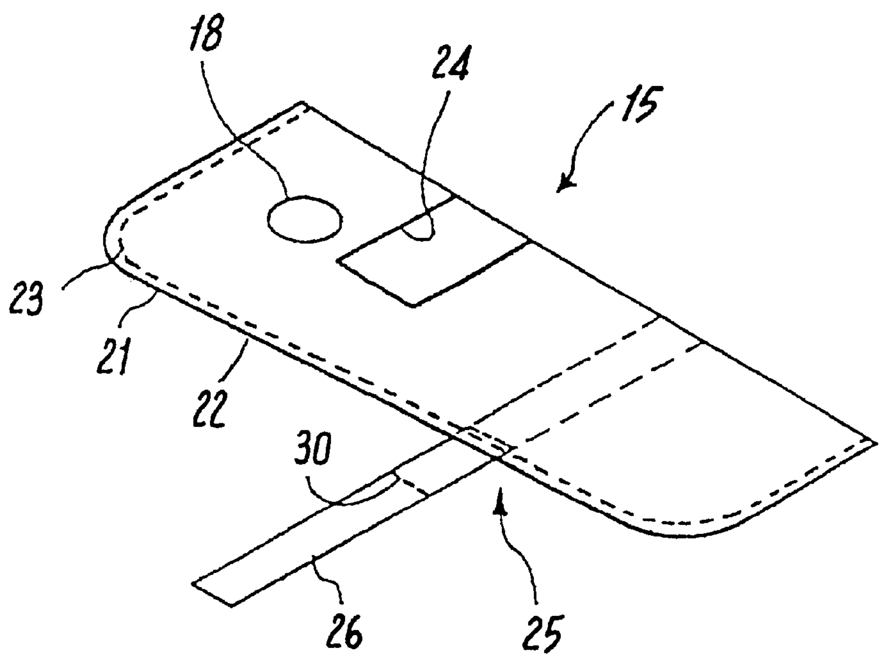
FIG. 3 is a perspective drawing showing a production step for the main bag unit from FIG. 2.

Additionally referring now to FIG. 3, during assembly of the first embodiment of main bag unit 15, first base fabric 21 and second base fabric 22 are affixed together along seam 23. Next, positions 25, 25 are determined and belt 26 is affixed between positions 25, 25 having width 29(not shown). The first and second ends of belt 26 extend away from positions 25, 25. During assembly, positions 25, 25 and the generally ovoid shape of base fabrics 21, 22 of main bag unit 15, are adjustable according to manufacturer design and need or other requirements.

Next during assembly, main bag unit 15 is folded along a central axis exposing a portion of gas entry opening 24 and all of vent hole 18 of first base fabric 21 and overlapping the first and second ends of belt 26. A seam line 30 affixes the first and second ends of belt 26 together across a width of the first and second ends of belt 26. Seam line 30 is typically created by sewing, but other methods to affix the first and second ends of belt 26 together may be used according to manufacturer design and need or other requirements.

Figure 4:
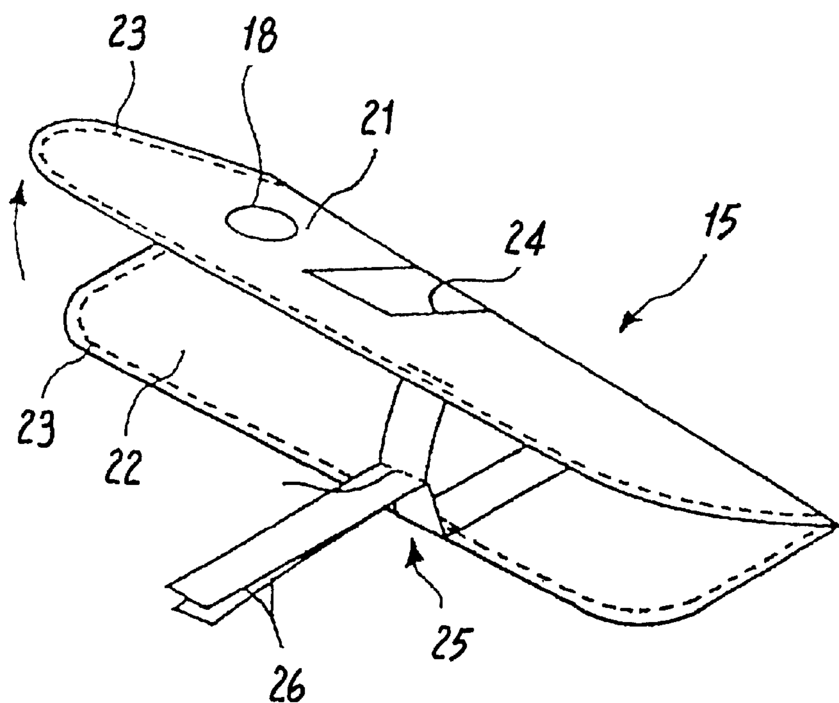
FIG. 4 is a perspective drawing showing a production step following the steps from FIG. 3.

Additionally referring now to FIG. 4, during assembly main bag unit 15 is partially opened ensuring access to second base fabric 22 and correct attachment of belt 26 at seam line 30.

Figure 5:
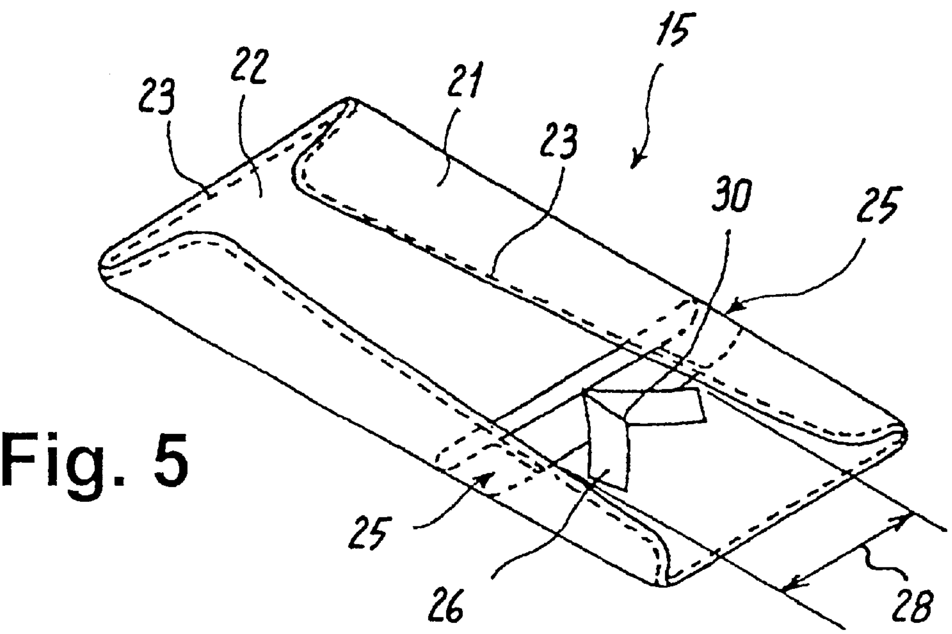
FIG. 5 is a perspective drawing showing a production step following the steps from FIG. 4.

Additionally referring now to FIG. 5, next during assembly main bag unit 15 is positioned so that an outside surface of second base fabric 22 and the first and second ends of belt 26 face an operator (as shown). Main bag unit 15 is adjusted so that portions of belt 26, affixed between seam line 30 and seam line 23, are separated and spread apart from the center line of main bag 15.

A distance 28 is the distance between corresponding seam lines 23 at positions 25, 25. Distance 28 is the span of belt 26 affixed between positions 25, 25, and is equal to or less than distance 29 defined between positions 25, 25 without belt 26. Distance 28 may be adjusted by adjusting the position of seam line 30 relative to seam line 23, or by changing the generally ovoid shape of base fabrics 21, 22. Distance 28 is adjustable according to manufacturer design and need or other requirements.

Figure 6:
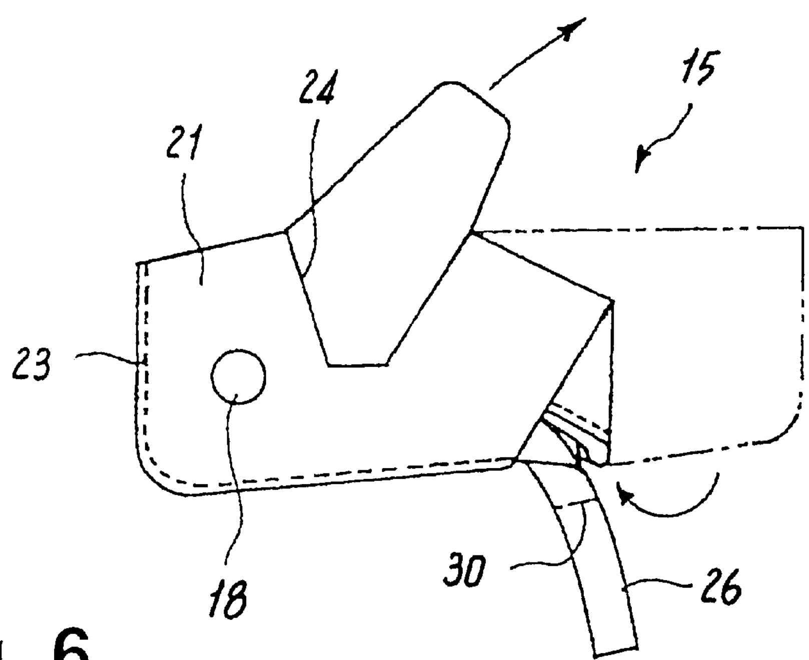
FIG. 6 is a perspective drawing showing a production step following the steps from FIG. 5.

Additionally referring now to FIG. 6, during assembly main bag unit 15 is turned inside-out, or reversed, generally through gas entry opening 24. During reversal, the inside surfaces of first base fabrics 21, 22 are exposed and seam line 23 and belt 26, with seam line 30, become contained within the reversed main bag unit 15.

Figure 7:
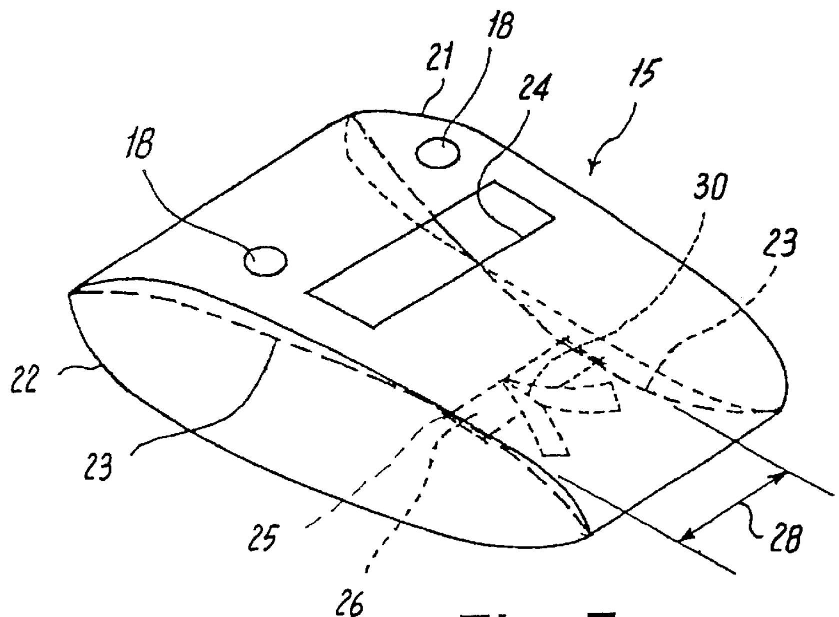
FIG. 7 is a perspective drawing showing a production step following the steps from FIG. 6.

Additionally referring now to FIG. 7, during assembly, main bag unit 15 is fully reversed and repositioned so that gas entry opening 24 and vent holes 18, 18 are exposed to an operator (as shown). Additionally, belt 26 with seam line 30 is evenly positioned between a pair of outside edges(not shown) of reversed main bag unit 15 so that belt 26 is centered between the outside edges of main bag unit 15 (as shown). Main bag unit 15 is then assembled within main bag canister 15*c* of air bag device 11.

Figure 8A:
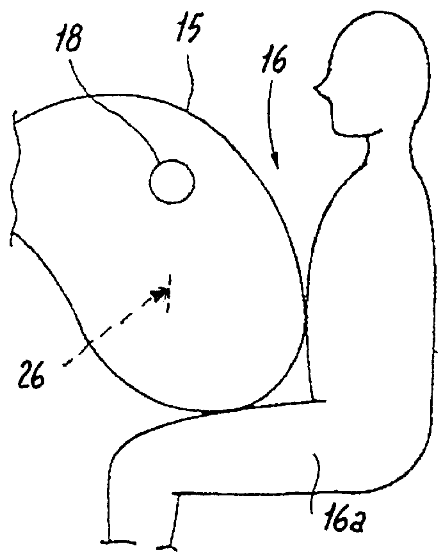
FIG. 8 (A) is a side view drawing showing the main bag unit expanding.
Figure 8B:
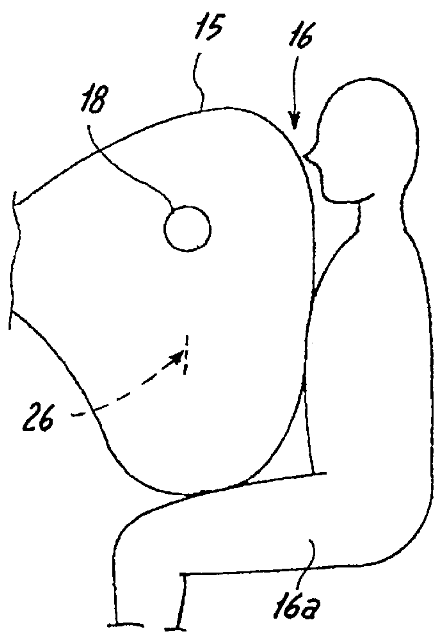

Additionally referring now to FIGS. 8A and 8B, as described, during operation of the first embodiment of main bag unit 15, inflator 14 (not shown) inflates main bag unit 15, and main bag unit 15 expands from main bag canister 15*c* (not shown) and instrument panel 12 (not shown). Main bag unit 15 expands towards an occupant 16*a* within occupant position 16. During expansion, belt 26, affixed between positions 25, 25,(not shown) causes positions 25, 25 to remain at fixed distance 28(not shown) while allowing the main bag unit 15 to further expand. As main bag unit 15 expands, belt 26, causes the area around positions 25, 25 to remain at fixed distance 28, resulting in a partial pinching inward at positions 25, 25.

As a result, the first embodiment of main bag unit 15 projects, longitudinally away from instrument panel 12, and towards occupant position 16 and occupant 16*a*, beyond conventional main bag position 15*b*, as described above. The increased longitudinal projection of main bag unit 15, towards main bag position 15*a*, is related to a number of factors, including the length of belt 26, positions 25, 25, the position of seam line 30, distances 28, and 29, and other factors. As a result, the horizontal projection of main bag unit 15 is minimized and the longitudinal projection of main bag unit 15 is increased to a position desired by a manufacturer or a customer. Adjusting the factors listed above allows a manufacture, or a customer, to direct the portions of main bag unit 15 restricted by belt 26 during expansion, and respond to needs for increased safety and reduced cost. As a result, using belt 26, the longitudinal projection of the two-piece main bag unit 15 away from instrument panel 12 may be increased with little or no increase in capacity within main bag unit 15.

Conventionally, where no belt 26 was used, expansion is controlled by the shape of base fabric pieces 21, 22, inflation pressure from inflator 14, and the positioning of air bag device 11 within instrument panel 12. The use of the present invention allows optimization of the two-piece main bag unit 15 when corresponding to the upper body of an occupant. Thus, during expansion, main bag unit 15 is optimally placed to cushion the upper body and head of occupant 16*a* compared to conventional two-piece main bag units and injury is minimized to occupant 16*a*. The first embodiment of main bag unit 15, additionally effects passengers 16*a* not wearing seatbelts(not shown) since main air bag unit 15 contacts passenger 16*a* further from instrument panel 12, thus improving protection for occupant 16*a*.

Main bag unit 15, with belt 26, may be manufactured using simple and inexpensive structures. During manufacture, base fabrics 21, 22 are positioned, together with belt 26, and sewn in a single step creating seam line 23. Using multiple stitches to attach belt 26 to main bag unit 15 increases an attachment strength of belt 26 to main bag unit 15.

The longitudinal projection of main bag unit 15 is easily adjusted since positions 25, 25, at which belt 26 is sewn to base fabrics 21, 22, are easily adjusted. For instance, as positions 25, 25 move closer together, the longitudinal projection of main bag unit 15 decreases. As positions 25, 25 move farther apart, the longitudinal projection of main bag unit 15 increases. Longitudinal projection may also be adjusted by adjusting the shape of base fabrics 21, 22.

Figure 9:
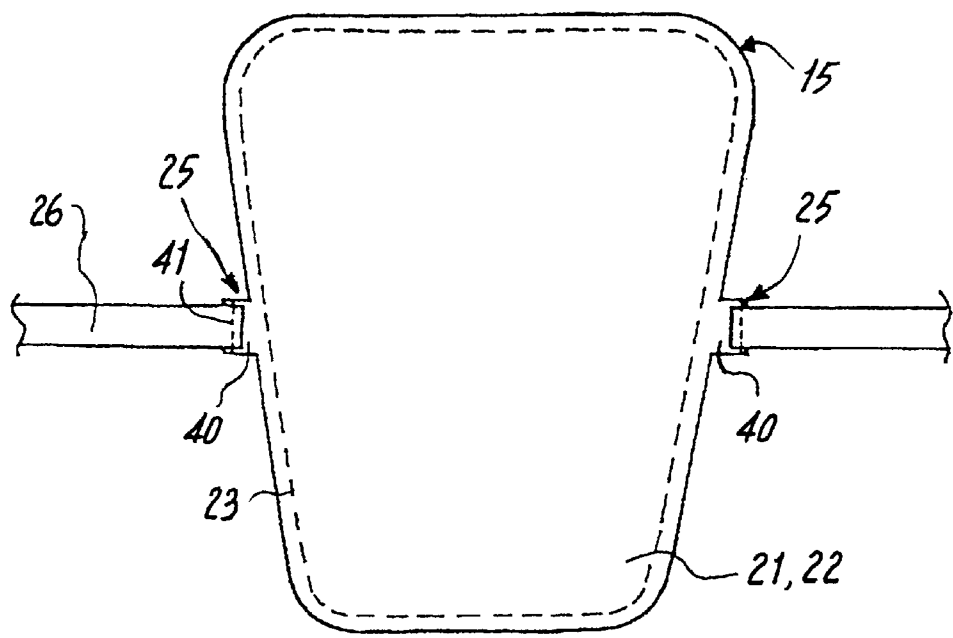
FIG. 9 is a perspective drawing showing a second embodiment of the present invention.

Additionally referring now to FIG. 9, a second embodiment of main bag unit 15, includes a pair of margins 40,40 projecting away from base fabrics 21, 22 at positions 25, 25. In the second embodiment, seam line 23 is positioned around a perimeter of base fabrics 21, 22 affixing base fabrics 21, 22 together. A pair of seam lines 41, 41 affix belt 26 to main bag unit 15 at margins 40, 40, as determined by production needs. Seam lines 41, 41 are distinct from outer perimeter seam line 23. Belt 26 may be affixed at seam lines 41, 41 individually (as shown), or may be continuous across base fabrics 21, 22 and affixed at seam lines 41, 41(not shown). The ability of belt 26 to be affixed individually or continuous across base fabrics 21, 22 allows increased production flexibility concerning the length of belt 26.

In the first embodiment of main bag unit 15, expansion tension is applied to belt 26 and a pressure load(not shown) is transmitted directly through belt 26 to seam line 23. Belt 26, at positions 25, 25, acts as a stress concentrator upon seam line 23 and fosters leakage of pressurized gas from main bag unit 15. Thus, uneven pressure loading or extreme pressure loading may cause leakage where belt 26 is affixed to seam line 23. Since vent holes 18, 18 are designed to release pressurized gas from main bag unit 15, unexpected gas release from seam line 23 is undesirable.

In the second embodiment, seam lines 41, 41 are separated from seam line 23 by projecting margins 40,40. Thus, seam lines 41, 41 separate the tension load of belt 26 of from seam line 23 to seam lines 41, 41. As a result, the second embodiment minimizes or eliminates the risk of unexpected gas release at seam line 23. After initial fabrication, the second embodiment of main bag unit 15 is employed similarly to the first embodiment.

Figure 10:
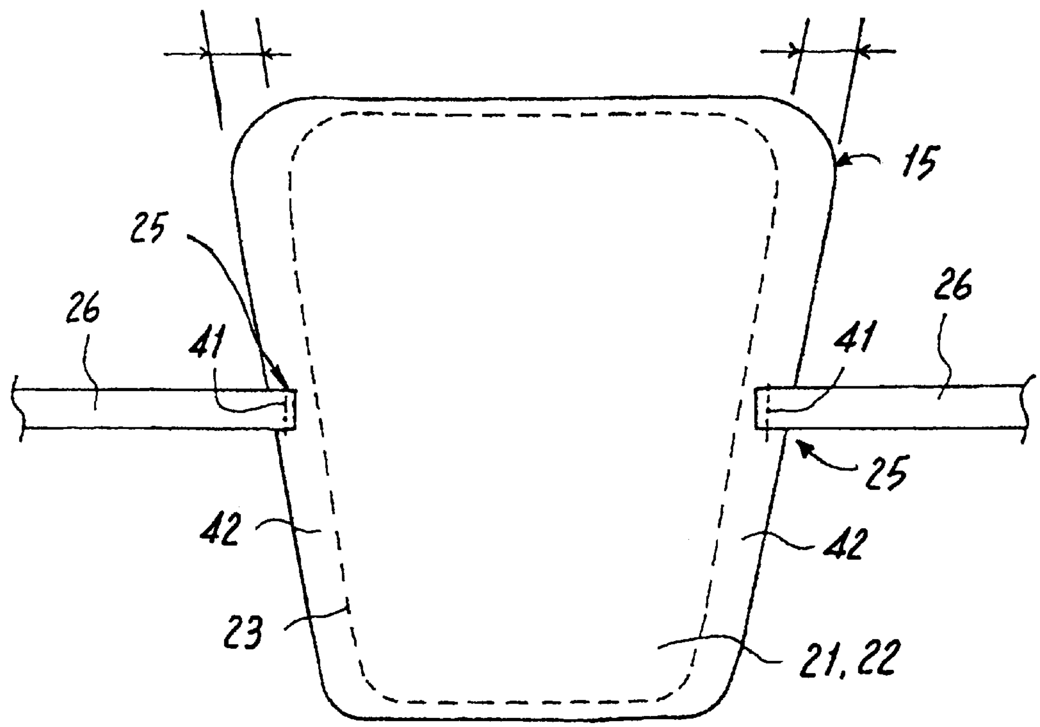
FIG. 10 is a perspective drawing showing a third embodiment of the present invention.

Additionally referring now to FIG. 10, a third embodiment of main bag unit 15, includes a pair of margins 42, 42 project outward from base fabrics 21, 22. In the third embodiment of main bag unit 15, seam line 23 is positioned around a perimeter of base fabrics 21, 22 and affixes base fabrics 21, 22 together. Seam lines 41, 41 affix belt 26 to main bag unit 15 along margins 42, 42 at positions 25, 25 as determined by production needs. As in the second embodiment, seam lines 41, 41 are distinct from outer perimeter seam line 23. Belt 26 may be affixed individually at seam lines 41, 41 (as shown) or may be continuous across base fabrics 21, 22 and affixed at seam lines 41, 41 (not shown). Since belt 26 may be affixed individually or continuously across base fabrics 21, 22 increased production flexibility with the length of belt 26 exists.

Margins 42, 42 extend continuously along the full height of base fabrics 21, 22, relative to the page. Margins 42, 42 facilitate attachment of belt 26 and allow attachment positions 25, 25 to be changed freely without changing the shape of base fabrics 21, 22. This eliminates the need for specially formed margins 40, 40 and allows storage of preassembled base fabrics 21, 22, thus minimizing costs while providing the same stress relieving attributes as found in the second embodiment. After initial fabrication, the third embodiment of main bag unit 15 is employed similarly to the first embodiment.

Figure 11:
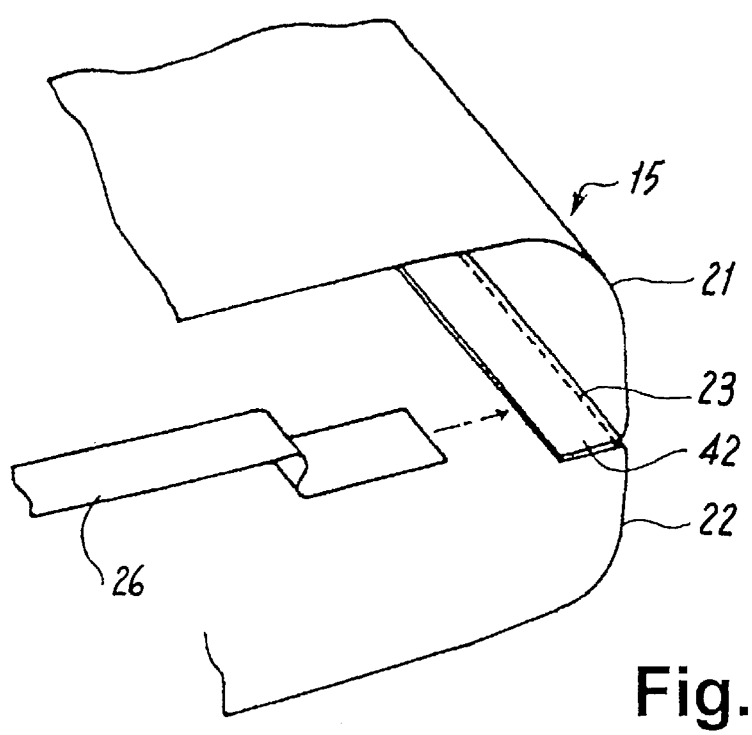
FIG. 11 is a perspective drawing of a fourth embodiment of the present invention.
Figure 12:
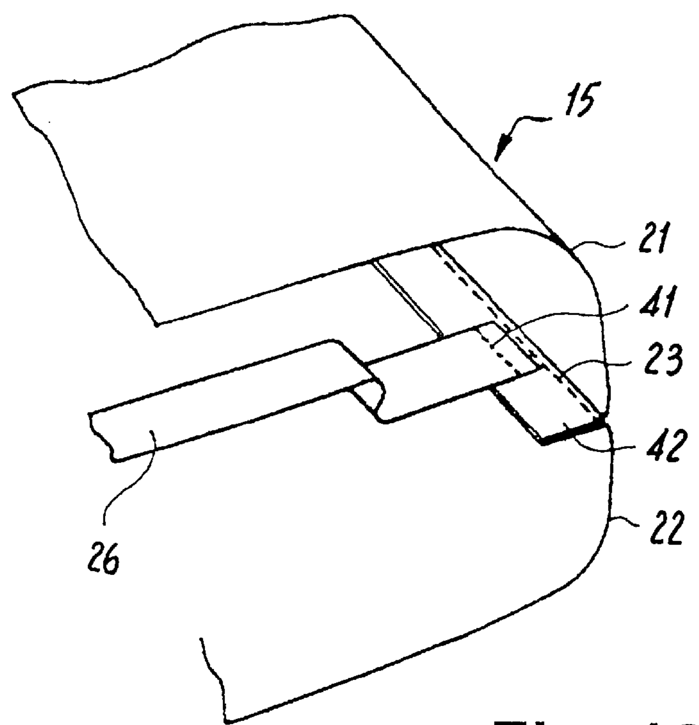
FIG. 12 is a perspective detail drawing of FIG. 11 after attachment of a belt.

Additionally referring now to FIGS. 11 and 12, a fourth embodiment of main bag unit 15, includes margins 42, 42 projecting inward from base fabrics 21, 22 along an outside width portion. In the fourth embodiment of main bag unit 15, seam line 23 is positioned around the perimeter of base fabrics 21, 22 to affix base fabrics 21, 22 together. Seam lines 41, 41 affix belt 26 to main bag unit 15 along margins 42, 42 as determined by production needs. Seam lines 41, 41 are distinct from outer perimeter seam line 23.

Belt 26 may be affixed individually at seam lines 41, 41 (as shown) or may be continuous across base fabrics 21, 22 and affixed at seam lines 41, 41 (not shown). The ability of belt 26 to be affixed individually or continuous across base fabrics 21, 22 allows increased production flexibility with the length of belt 26.

In the fourth embodiment, an end of belt 26 may be placed on an outside portion of margins 42, 42 and affixed by seam line 41 (as shown) or may be placed between margins 42, 42 and then affixed by seam line 41(not shown). In the fourth embodiment, the end of belt 26 is alternatively placed between or on margins 42, 42. As a result, increased production flexibility is achieved and a reduction in costs. After initial fabrication, the fourth embodiment of main bag unit 15 is employed similarly to the first embodiment.

Figure 13:
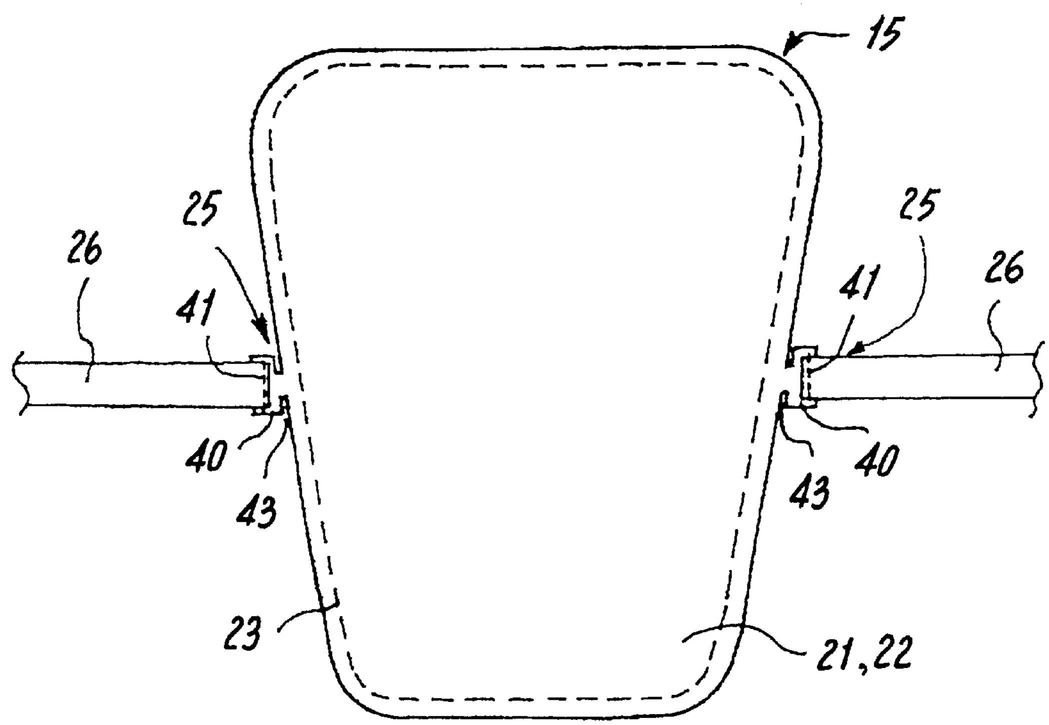
FIG. 13 is a perspective detail drawing of a fifth embodiment of the present invention.
Figure 14:
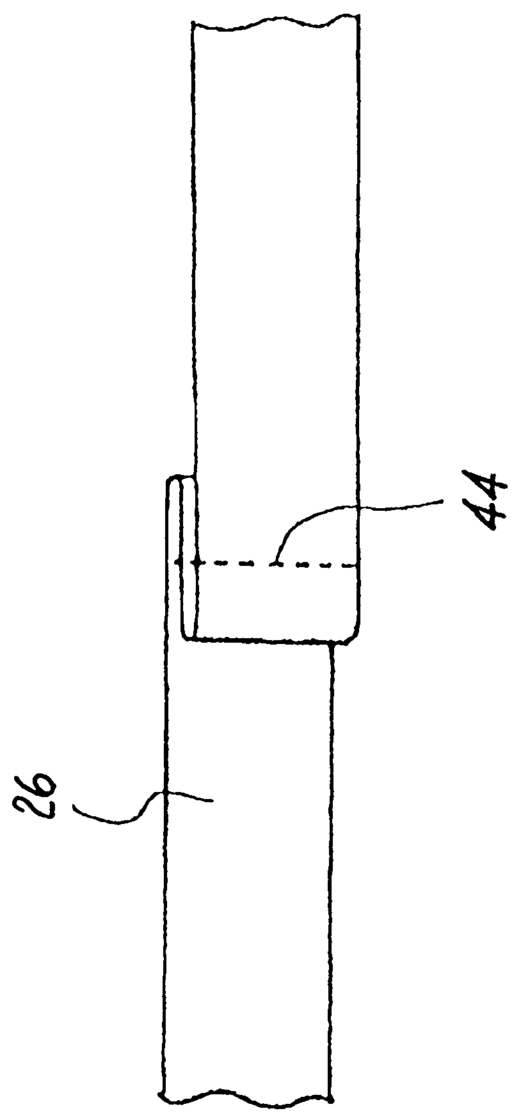
FIG. 14 is a perspective detail drawing of a belt after adjustment in any one of the embodiments of the present invention.
Figure 15:
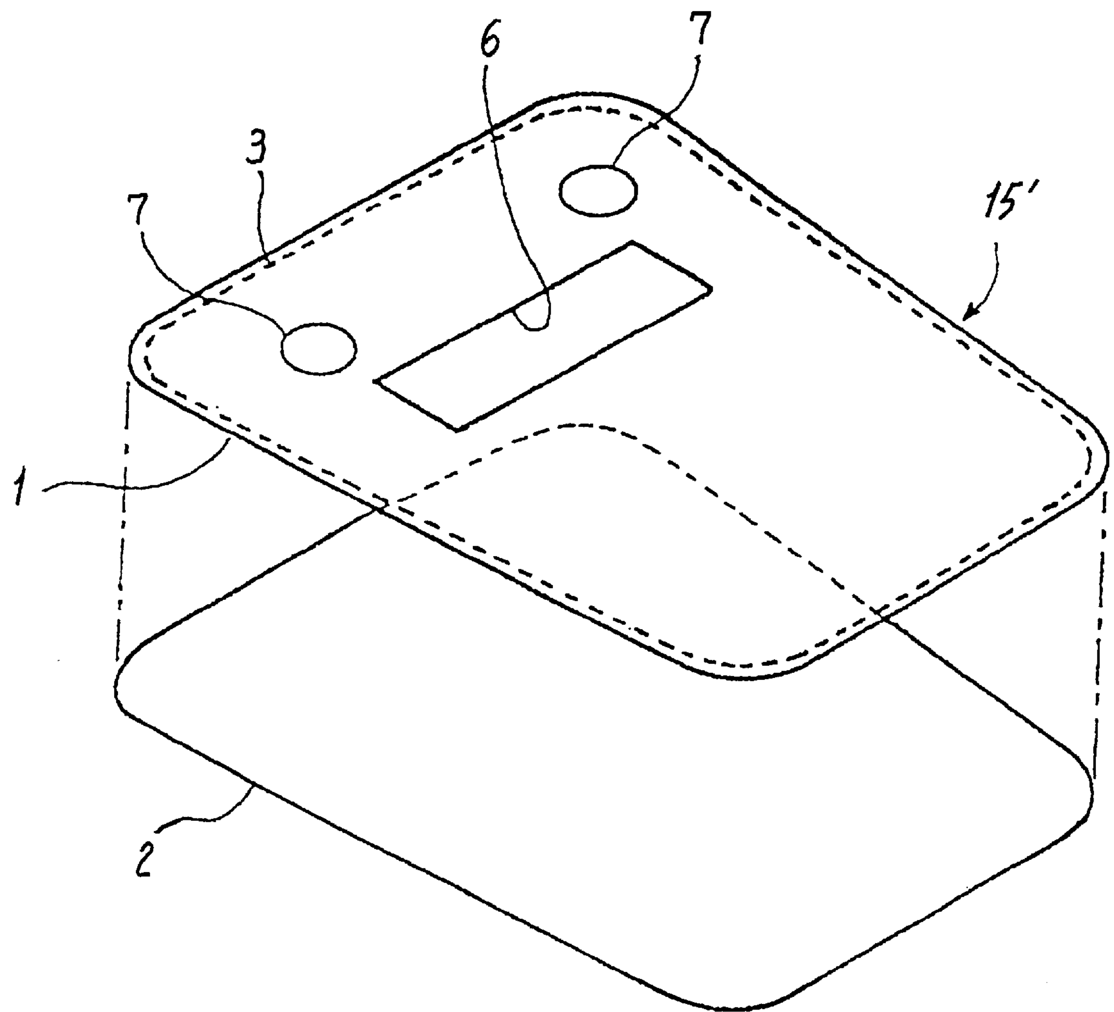
FIG. 15 is an exploded perspective drawing of a conventional two-piece bag.
Figure 16:
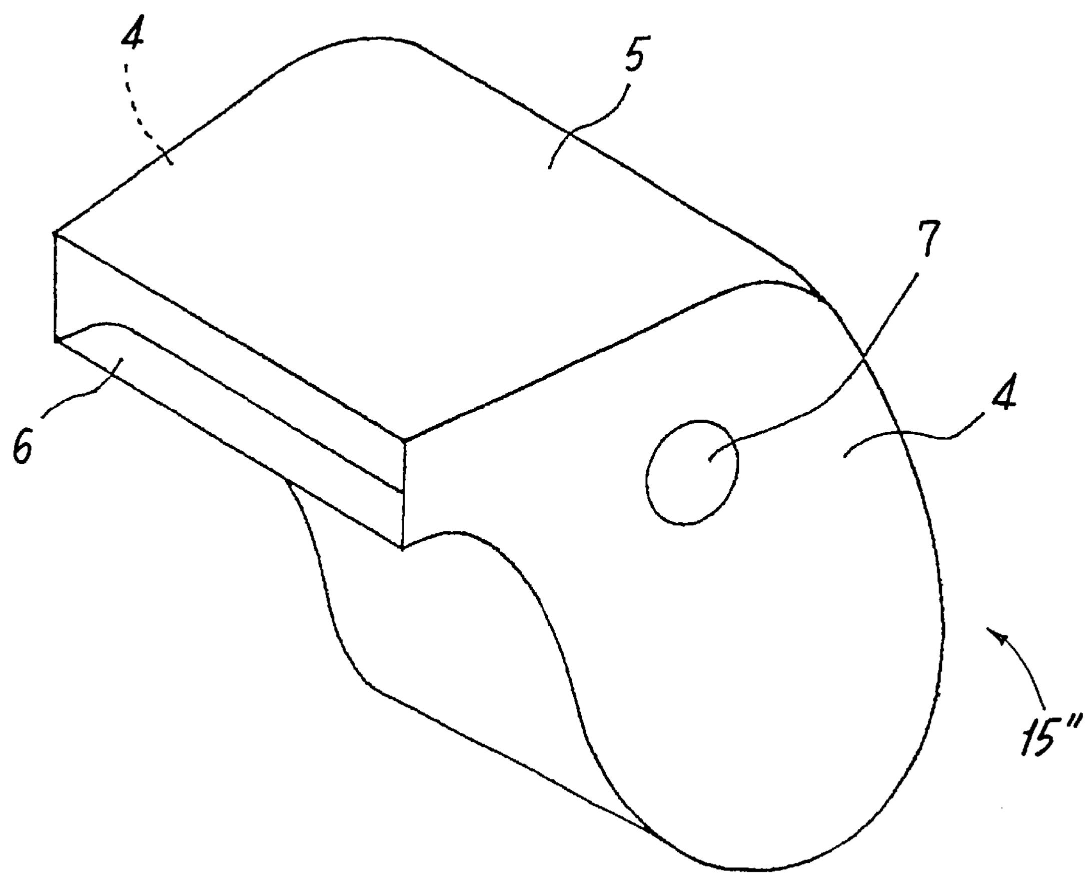
FIG. 16 is an perspective drawing of a conventional three-piece bag.

Referring now to FIGS. 13 and 14, a fifth embodiment of main bag unit 15 includes a pair of weak sections 43, 43 between margins 40, 40 corresponding and base fabrics 21, 22. Weak sections 43, 43 act as stress concentrators and arc designed to preferentially fail under irregular pressure applied to belt 26 and seam lines 41, 41. Under uneven or rapid expansion, irregular pressure loads may be transmitted through belt 26 and develop where margins 40, 40 attach to base fabrics 21, 22. Where irregular pressure load transmits through margins 40, 40, seam line 23 may fail and inhibit main bag unit 15 in protecting occupant **16*a*. As a result, weak sections 43, 43 serve to protect the integrity of seam line 23 and allow main bag unit 15 to protect occupant 16*a*** (not shown).

As previously described, a pair of seam lines 41, 41 affix belt 26 to main bag unit 15 along margins 40, 40 as determined by production needs. Belt 26 may be individually affixed at seam lines 41, 41 (as shown) or may be continuous across base fabrics 21, 22 and affixed at seam lines 41, 41(not shown).

In the fifth embodiment, an intermediate section of belt 26 is bent into an overlapped section and sewn along a seam line 44. The overlapping section and seam line 44 allows the length of belt 26 to be easily adjusted according to manufacturing needs. The overlapping section and seam line 44 may also be used as a stress concentrator and designed to preferentially fail under uneven or excessive pressure. For example, seam line 44 may be sewn with weaker thread than seam lines 23, 30, or 41, thus causing seam line 44 to fail under pressure load prior to seam lines 23, 30, or 41 thereby maintaining safety. After initial fabrication, the fifth embodiment of main bag unit 15 is employed similarly to the first embodiment.

There are multiple benefits to the improved design of the automotive air bag device 11, including the multiple embodiments.

First, the longitudinal projection of main bag unit 15 is increased from conventional main bag position **15*b* to main bag position 15*a*, thus increasing the safety of occupant 16*a*** in an accidental impact.

Second, where belt 26 is used, additional longitudinal projection of main bag unit 15 is achieved under similar conventional pressures. Thus, additional longitudinal projection is achieved while retaining a two-piece construction method and not substantially increasing the volume or pressure of main bag unit 15. The improved design enables repositioning or redistribution of the inflated volume within main bag unit 15, thus reducing manufacturing time and costs while maintaining safety.

Third, belt 26 has a simple and inexpensive structure and is used as a width restricting means, thus increasing projection of main bag unit 15 and minimizing manufacturing costs. Where the width restricting means serves to adjust the expansion of main bag unit 15, alternative width restricting means may be used thus providing easy substitution and replacement under manufacturing pressures. As a result, manufacturers are not dependent upon single source suppliers and may obtain supplies easily and relatively inexpensively. For example, a three part belt, a single length of cord or rope, or an elastic or web like material may be used to replace belt 26 as a width restricting means as long as similar function is achieved. For a second example, the width restricting means may be a rigid or semi-rigid, or hinged element serving an equivalent function.

Fourth, the simplified design of belt 26 allows multiple embodiments to be constructed thus allowing for manufacturer adaptation to production and customer needs. For example, belt 26, currently affixed at positions 25, 25 on seam line 23, provides expansion of main bag unit 15 relative to the upper body and head regions of occupant 16*a*. Alternatively, belt 26 may be adjusted in overall length and the position of seam line 30 adjusted selectively to increase or decrease the longitudinal projection of main bag unit 15. However, where occupant's 16*a* size changes or other manufacturer or customer needs apply, positions 25, 25 can be selectively and quickly changed thus maximizing manufacturer speed and adaptation.

Fifth, the simplified design allows belt 26 to be supplied in either one or two individual parts. Where belt 26 is formed in one part, belt 26 may be continuous across base fabrics 21, 22, affixed at positions 25, 25 and sewn at seam line 30. Where belt 26 is formed in two parts each end may be individually affixed at positions 25, 25, and sewn together at seam line 30. Thus, belt 26 may be initially provided in variable lengths and portions but adapted during manufacturing to provide a similar result.

Sixth, belt 26 may be affixed to main bag unit 15 either before or after reversal of main bag unit 15. When belt 26 is affixed to main bag unit 15 prior to reversal, an operator may affix belt 26 with minimal time and effort. However, when belt 26 is affixed to main bag unit 15 after reversal, an operator can affix belt 26 while working through gas entry opening 25 or vent holes 18, 18. Thus, where main bag units 15 are produced without belt 26 by mistake or mis-design, main bag units 15 may be retroactively provided with belt 26. As a result, time is saved and costs are minimized. Additionally, when belt 26 has been previously affixed to main bag unit 15, later manipulation, adjustment, or correction of positions 25, 25 or seam lines 30, 41 and 44 and easily accomplished.

Seventh, since belt 26 is sewn to main bag unit 15, it is possible to remove belt 26 for re-attachment or repositioning after initial manufacturer in response to a redesign or change in customer demand. Thus while sewing is a preferred method for affixing belt 26 to main bag unit, alternatively methods are easily substituted by a manufacturer. For example, belt 26 may be affixed to main bag unit by glue or grommets without effecting it's performance.

Eighth, despite the embodiments mentioned above, after assembly of main bag unit 15 later assembly is carried out in a generally similar manner. Thus, changes in manufacturing are minimized and costs more easily controlled.

Ninth, where a manufacturer desires to increase the strength of belt 26, addition of a second belt 26, spliced anywhere between positions 25, 25 in any embodiment is easily carried out. As a result, manufacturing is responsive to quickly changing customer demands or to increasing failure rates, thus minimizing down time, and maximizing customer satisfaction.

Tenth, where belt 26 is sewn into main bag unit 15, the quantity of additional sewing required is minimal thus simplifying the sewing step and making the sewing operation only minimally harder for a large increase in performance.

Eleventh, since the use of belt 26 as a width restricting means allows a two piece main bag design to perform a similar function as a three-piece main bag design, customer and manufacturer costs are minimized.

Twelfth, where concerns exists regarding uneven pressure or over pressure weakening or causing seam line 23 to fail, the multiple embodiments described provide multiple responsive structures. For example, concentrating weak sections 43, 43, seam lines 30, 41, and 44, margins 40, 40, and margins 42, 42 all exist as alternative failure structures to minimize the risk of pressure failure at seam line 23. As as result, the load on seam line 23 may be maintained and occupant 16*a* may be safely restrained.

Thirteenth, additional safety responsive structures can be easily incorporated into the embodiments described. For example, a secondary seam line(not shown) may be positioned on belt 26 beyond seam line 30, to act as a back up or stress release device minimizing failure should seam line 30 fail under use. For a second example, an other secondary seam line(not shown) may be positioned on a folded portion of belt 26, beyond seam line 44, to act as a back up stress release device minimizing the risk of seam line 23 failure.

Fourteenth, the position of seam line 30 on belt 26 is easily adjusted to adjust the longitudinal projection of main bag unit 15 from instrument panel 12. Additionally, where manufacturing defects occur causing seam line 30 to be mis-positioned, replacement is easily accomplished by first removal and then repositioning of seam line 30. Thus, manufacturing defect rates are reduced and costs are minimized.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. Thus although a nail and screw may not be structural equivalents in that a nail relies entirely on friction between a wooden part and a cylindrical surface whereas a screw's helical surface positively engages the wooden part, in the environment of fastening wooden parts, a nail and a screw may be equivalent structures.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An air bag device comprising:

an air bag unit;

said air bag unit includes at least a first and a second base piece;

said base pieces affixed together along a first seam element;

a first and a second lateral position on said first seam element established relative to an optimal external occupant position;

said first and second lateral positions separated by a first distance;

means for restricting fixed between said first and second lateral positions;

said restricting means having a restrictive length;

said restrictive length being less than said first distance;

said restricting means reducing said first distance thereby increasing expansion of said air bag unit into said external occupant position during inflation;

means for minimizing expansion failure along said first seam element;

said minimizing means absorbing expansion force thereby minimizing failure of said first seam element when said air bag unit expands;

said minimizing means including a first and a second margin extending from said base pieces;

said margins extending away from said corresponding lateral positions;

said restricting means affixed between said first and said second margins along a pair of seams distinct from said first seam element; and said pair of seams and said margins minimizing failure of said first seam element when said air bag unit expands.

2. An air bag device, according to claim 1, wherein:

said minimizing means includes at least a first and a second weak section;

said weak sections formed between said first seam element and each said corresponding margin; and said weak sections minimizing failure of said first seam element when said air bag unit expands.

3. In an automotive air bag device equipped with a main bag unit, the main bag unit comprising:

a first and a second base fabric;

each said first and second base fabric has substantially the same shape;

each said first and second base fabric fixed together along an outer perimeter by a seam line;

said outer perimeter having a first and a second lateral side;

said lateral sides positioned relative to an occupant position;

said lateral sides separated by a distance;

means for restricting expansion of said main bag unit during inflation;

said restricting means providing localized reduction of said distance between said lateral sides thereby increasing projection of said main bag unit towards said occupant position;

said restricting means being a belt having a first and a second end;

said belt being sewn to said base fabrics along each said lateral side; and a pair of positions intermediate said ends sewn together thereby increasing projection of said main bag unit towards said occupant position.

4. In an automotive air bag device equipped with a main bag unit, the main bag unit comprising:

a first and a second base fabric;

each said first and second base fabric has substantially the same shape;

each said first and second base fabric fixed together along an outer perimeter by a seam line;

said outer perimeter having a first and a second lateral side;

said lateral sides positioned relative to an occupant position;

said lateral sides separated by a distance;

means for restricting expansion of said main bag unit during inflation;

said restricting means provides localized reduction of said distance between said lateral sides thereby increasing projection of said main bag unit towards said occupant position;

a pair of margins extending from said base fabrics away from said outer perimeter; and said restricting means affixed along each said margin at a corresponding lateral seam line adjacent to said lateral sides.

5. An automotive air bag device according to claim 4, further comprising:

a first and a second weak section; and each said weak section positioned between each said corresponding margin and said seam line.

6. In an automotive air bag device equipped with a main bag unit, the main bag unit comprising:

a first and a second base fabric;

each said first and second base fabric having substantially the same shape;

each said first and second base fabric fixed together along an outer perimeter by a first seam line;

said outer perimeter having a first and a second lateral side;

said lateral sides positioned relative to an occupant position;

said lateral sides separated by a distance;

means for restricting expansion of said main bag unit during an inflation;

said restricting means provides localized reduction of said distance between said lateral sides thereby increasing projection of said main bag unit towards said occupant position;

said restricting means being overlapped at an intermediate section;

an intermediate seam line fixed across said intermediate section thereby reducing said distance between said lateral sides;

said restricting means additionally including a second overlapping portion between said lateral sides having an affixed second seam line portion; and said second overlapping portion and said affixed second seam line portion being adjustable according to an external design criteria.

* * * * *